US011188855B2

(12) United States Patent
Lhota et al.

(10) Patent No.: US 11,188,855 B2
(45) Date of Patent: Nov. 30, 2021

(54) MACHINE LEARNING TASK ASSIGNMENT (71) Applicant: INTERNATIONAL BUSINESS MACHINES CORPORATION, Armonk, NY (US)

(72) Inventors: Colleen Lhota, Cary, NC (US); Ashley K. Silva, Durham, NC (US); Aksel Davis, Raleigh, NC (US); Jocelyn Sese, Knightdale, NC (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 15/935,211

(22) Filed: Mar. 26, 2018

(65) Prior Publication Data

US 2019/0295013 A1    Sep. 26, 2019

(51) Int. Cl.
  *G06Q 10/06*   (2012.01)
  *G06N 20/00*   (2019.01)
  *G06F 8/65*    (2018.01)
  *G06F 16/27*   (2019.01)

(52) U.S. Cl.
  CPC ......... *G06Q 10/06311* (2013.01); *G06F 8/65* (2013.01); *G06F 16/27* (2019.01); *G06N 20/00* (2019.01); *G06Q 10/063114* (2013.01)

(58) Field of Classification Search
  None
  See application file for complete search history.

(56) References Cited

U.S. PATENT DOCUMENTS

| 8,136,114 | B1 | 3/2012 | Gailloux et al. |
| 8,347,295 | B1 | 1/2013 | Robertson et al. |
| 9,558,323 | B2 | 1/2017 | Jester et al. |
| 2003/0149598 | A1 | 8/2003 | Santoso et al. |
| 2005/0096962 | A1 | 5/2005 | Narasimhan |

(Continued)

OTHER PUBLICATIONS

Hjortskov, N., Rissen, D., Blangsted, A.K. et al. The effect of mental stress on heart rate variability and blood pressure during computer work. 2004. Eur J Appl Physiol 92, 84-89. (Year: 2004).*

(Continued)

*Primary Examiner* — Brian M Epstein
*Assistant Examiner* — Sara Grace Brown
(74) *Attorney, Agent, or Firm* — Schmeiser, Olsen & Watts; Brian M. Restauro (57) ABSTRACT A method and system for improving a machine learning task assignment process is provided to address productivity with respect to satisfaction. The method includes connecting hardware devices to a server system. Job related data associated with job roles for individuals is retrieved and associated with a time period. Work related items of the job related data are presented and selections for work related items are retrieved via selectors for the work items. Expected and actual satisfaction ratings for the work related items are received and analyzed in accordance with an order in which they are received. At least one work item is assigned to a user and a specialized memory repository is generated within a portion of a memory device. Results of the assignment are stored within the specialized memory repository. Self-learning software code for executing future task assignment processes is generated and modified based on reported satisfaction ratings.

12 Claims, 6 Drawing Sheets

(56) References Cited

U.S. PATENT DOCUMENTS

| | | | |
|---|---|---|---|
| 2007/0300174 A1* | 12/2007 | Macbeth | G06Q 10/10 715/772 |
| 2013/0006717 A1* | 1/2013 | Oleson | G06Q 10/06311 705/7.41 |
| 2013/0132142 A1 | 5/2013 | Wood-Salomon et al. | |
| 2013/0218619 A1* | 8/2013 | Friedlander | G06Q 10/063112 705/7.14 |
| 2014/0039955 A1 | 2/2014 | Chung-I | |
| 2014/0082072 A1 | 3/2014 | Kass et al. | |
| 2014/0228649 A1* | 8/2014 | Rayner | G16H 20/30 600/301 |
| 2015/0366502 A1* | 12/2015 | Kusik | A61B 5/02 600/301 |
| 2016/0140479 A1 | 5/2016 | Hambrick | |
| 2016/0217410 A1 | 7/2016 | Santos | |
| 2016/0286047 A1* | 9/2016 | Matula | G06Q 10/06311 |
| 2016/0321560 A1* | 11/2016 | Ashtiani | G06N 20/00 |
| 2016/0321614 A1* | 11/2016 | Leslie | G06Q 10/1053 |
| 2016/0350801 A1* | 12/2016 | Vincent | G06N 20/00 |
| 2017/0046643 A1* | 2/2017 | Bishop | G06Q 10/0639 |
| 2017/0103360 A1* | 4/2017 | Ristock | H04L 67/42 |
| 2017/0111507 A1* | 4/2017 | McGann | G06N 5/04 |
| 2017/0132572 A1* | 5/2017 | Joo | G06Q 10/1093 |
| 2017/0178052 A1* | 6/2017 | Durham | G06Q 10/06311 |
| 2017/0296129 A1* | 10/2017 | Petterson | A61B 5/742 |
| 2018/0018409 A1* | 1/2018 | Peters | G06F 30/13 |
| 2018/0032944 A1* | 2/2018 | Sarvana | G06Q 10/063114 |
| 2018/0107943 A1* | 4/2018 | White | G06N 5/003 |
| 2019/0138972 A1* | 5/2019 | Reid | G06Q 10/06393 |
| 2019/0258944 A1* | 8/2019 | Lee | G06N 20/20 |

OTHER PUBLICATIONS

Riese, Harriëtte, et al. "Job strain in relation to ambulatory blood pressure, heart rate, and heart rate variability among female nurses." 2004. Scandinavian journal of work, environment & health: 477-485. (Year: 2004).*

Elzeiny, Sami, and Marwa Qaraqe. "A Machine Learning Approach for Detecting Mental Stress Based on Biomedical Signal Processing." Mar. 15, 2018. Qatar Foundation Annual Research Conference Proceedings vol. 2018 Issue 3. vol. 2018. No. 3. Hamad bin Khalifa University Press (HBKU Press). (Year: 2018).*

Mell, P., Grance, T., The NIST Definition of Cloud Computing, Sep. 2011, NIST (Year: 2011).*

Rahman, H, et al., Task Assignment Optimization in Collaborative Crowdsourcing, 2015, 2015 IEEE International Conference on Data Mining (Year: 2015).*

Hassan, Umair ul; Adaptive Task Assignment in Spatial Crowdsourcing; Submitted in fulfillment of the requirements for the degree of Doctor of Philosophy; The Insight Centre for data Analytics, National University of Ireland, Galway; Aug. 2016; 267 pages.

Luo, Lingzhi; Distributed Algorithm Design for Constrained Multi-robot Task Assignment; Thesis submitted in partial fulfillment of the requirements for PhD's degree; Robotics Institute, School of Computer Science, Carnegie Mellon University; Jun. 2014; 135 pages.

Dynamic work item assignment in a manual work center; https://www.servicespan.net/product/dynamic-work-item-assignment.html; retrieved from the Internet Aug. 30, 2021; 3 pages.

Enjoyment-Performance Methodology; http://www.harrisonassessments.com/enjoyment-performance.html; retrieved from the Internet Aug. 30, 2021; 2 pages.

Enjoyment-Performance Methodology; http://www.harrisonassessments.de/Enjoyment-Performance-Sales-Sheet.pdf Yetrieved from the Internet Aug. 30, 2021; 1 page.

Green, Carolyn W et al.; Changing Less-Preferred Duties to More-Preferred: A Potential Strategy for Improving Supervisor Work Enjoyment; Journal of Organization Behavior Management 28:2; 2008; pp. 90-109.

Mell, Peter et al.; "The NIST Definition of Cloud Computing;" National Institute of Standards and Technology; Special Publication 800-145; Sep. 2011; 7 pages.

Reed, Derek D et al.; Assessing and Increasing Staff Preference for Job Tasks Using Concurrent-Chains Schedules and Probabilistic Outcomes; Journal of Organization Behavior Management; vol. 32, Issue 3; Aug. 30, 2021; pp. 253-262.

* cited by examiner

MACHINE LEARNING TASK ASSIGNMENT

The present invention relates generally to a method for using machine learning code for assigning tasks and in particular to a method and associated system for improving self-learning software technology associated with enabling sensors for detecting work related selection satisfaction associated with users and automatically generating and modifying self-learning software code.

BACKGROUND

Efficiently assigning tasks typically includes an inaccurate optimization process with little flexibility. Controlling and modifying software associated with task assignment may include a complicated process that may be time consuming and require a large amount of resources. Accordingly, there exists a need in the art to overcome at least some of the deficiencies and limitations described herein above.

SUMMARY

A first aspect of the invention provides a machine learning task assignment improvement method comprising: connecting, by one or more, a hardware device and additional hardware devices to a remote server database system; retrieving, by the one or more processors from the remote server database system, job related data associated with job roles for a plurality of users; initially assigning to the plurality of users, by the one or more processors in response to a command from an authoritative source, work related items of the job related data; presenting, by the one or more processors to a user of the plurality of users, the work related items of the job related data to be performed during a specified time period; receiving, by the one or more processors from the user via sensors of the hardware device, selections for specified work related items of the work related items; receiving, by the one or more processors from additional users of the plurality of users via additional sensors of the additional hardware devices, additional selections for additional work related items of the work related items; receiving, by the one or more processors from the user and the additional users, expected satisfaction ratings for the specified work related items and the additional work related items; first analyzing, by the one or more processors, the selections and the additional selections with respect to the expected satisfaction ratings; first assigning to the user, by the one or more processors based on results of the first analyzing, at least one work item of the selections; second assigning to the additional users, by the one or more processors based on the results of the first analyzing, additional work related items of the additional selections; receiving, by the one or more processors from the user and the additional users, actual satisfaction ratings for the specified work related items and the additional work related items; second analyzing, by the one or more processors, the first selections and the additional selections with respect to the actual satisfaction ratings; generating, by the one or more processors, a specialized memory repository within a specified portion of a hardware memory device; storing, by the one or more processors within the specialized memory repository, results of the first assigning and the second assigning; generating, by the one or more processors from the results of the first assigning, the second assigning, the first analyzing, and the second analyzing, self-learning software code for executing future task assignment processes; and modifying, by the one or more processors based on results of the future task assignment processes, the self-learning software code.

A second aspect of the invention provides a computer program product, comprising a computer readable hardware storage device storing a computer readable program code, the computer readable program code comprising an algorithm that when executed by one or more processors implements a machine learning machine learning task assignment improvement method, the method comprising: connecting, by the one or more processors a hardware device and additional hardware devices to a remote server database system; retrieving, by the one or more processors from the remote server database system, job related data associated with job roles for a plurality of users; initially assigning to the plurality of users, by the one or more processors in response to a command from an authoritative source, work related items of the job related data; presenting, by the one or more processors to a user of the plurality of users, the work related items of the job related data to be performed during a specified time period; receiving, by the one or more processors from the user via sensors of the hardware device, selections for specified work related items of the work related items; receiving, by the one or more processors from additional users of the plurality of users via additional sensors of the additional hardware devices, additional selections for additional work related items of the work related items; receiving, by the one or more processors from the user and the additional users, expected satisfaction ratings for the specified work related items and the additional work related items; first analyzing, by the one or more processors, the selections and the additional selections with respect to the expected satisfaction ratings; first assigning to the user, by the one or more processors based on results of the first analyzing, at least one work item of the selections; second assigning to the additional users, by the one or more processors based on the results of the first analyzing, additional work related items of the additional selections; receiving, by the one or more processors from the user and the additional users, actual satisfaction ratings for the specified work related items and the additional work related items; second analyzing, by the one or more processors, the first selections and the additional selections with respect to the actual satisfaction ratings; generating, by the one or more processors, a specialized memory repository within a specified portion of a hardware memory device; storing, by the one or more processors within the specialized memory repository, results of the first assigning and the second assigning; generating, by the one or more processors from the results of the first assigning, the second assigning, the first analyzing, and the second analyzing, self-learning software code for executing future task assignment processes; and modifying, by the one or more processors based on results of the future task assignment processes, the self-learning software code.

A third aspect of the invention provides a hardware device coupled to one or more processors connected to a computer-readable memory unit, the memory unit comprising instructions that when executed by one or more processors implements a machine learning task assignment improvement method comprising: connecting, by the one or more processors, the hardware device and additional hardware devices to a remote server database system; retrieving, by the one or more processors from the remote server database system, job related data associated with job roles for a plurality of users; initially assigning to the plurality of users, by the one or more processors in response to a command from an authoritative source, work related items of the job related data; presenting, by the one or more processors to a user of the plurality of users, the work related items of the job related data to be performed during a specified time period; receiving, by the one or more processors from the user via sensors of the hardware device, selections for specified work related items of the work related items; receiving, by the one or more processors from additional users of the plurality of users via additional sensors of the additional hardware devices, additional selections for additional work related items of the work related items; receiving, by the one or more processors from the user and the additional users, expected satisfaction ratings for the specified work related items and the additional work related items; first analyzing, by the one or more processors, the selections and the additional selections with respect to the expected satisfaction ratings; first assigning to the user, by the one or more processors based on results of the first analyzing, at least one work item of the selections; second assigning to the additional users, by the one or more processors based on the results of the first analyzing, additional work related items of the additional selections; receiving, by the one or more processors from the user and the additional users, actual satisfaction ratings for the specified work related items and the additional work related items; second analyzing, by the one or more processors, the first selections and the additional selections with respect to the actual satisfaction ratings; generating, by the one or more processors, a specialized memory repository within a specified portion of a hardware memory device; storing, by the one or more processors within the specialized memory repository, results of the first assigning and the second assigning; generating, by the one or more processors from the results of the first assigning, the second assigning, the first analyzing, and the second analyzing, self-learning software code for executing future task assignment processes; and modifying, by the one or more processors based on results of the future task assignment processes, the self-learning software code.

The present invention advantageously provides a simple method and associated system capable of efficiently optimizing assignment of tasks.

DETAILED DESCRIPTION

Figure 1:
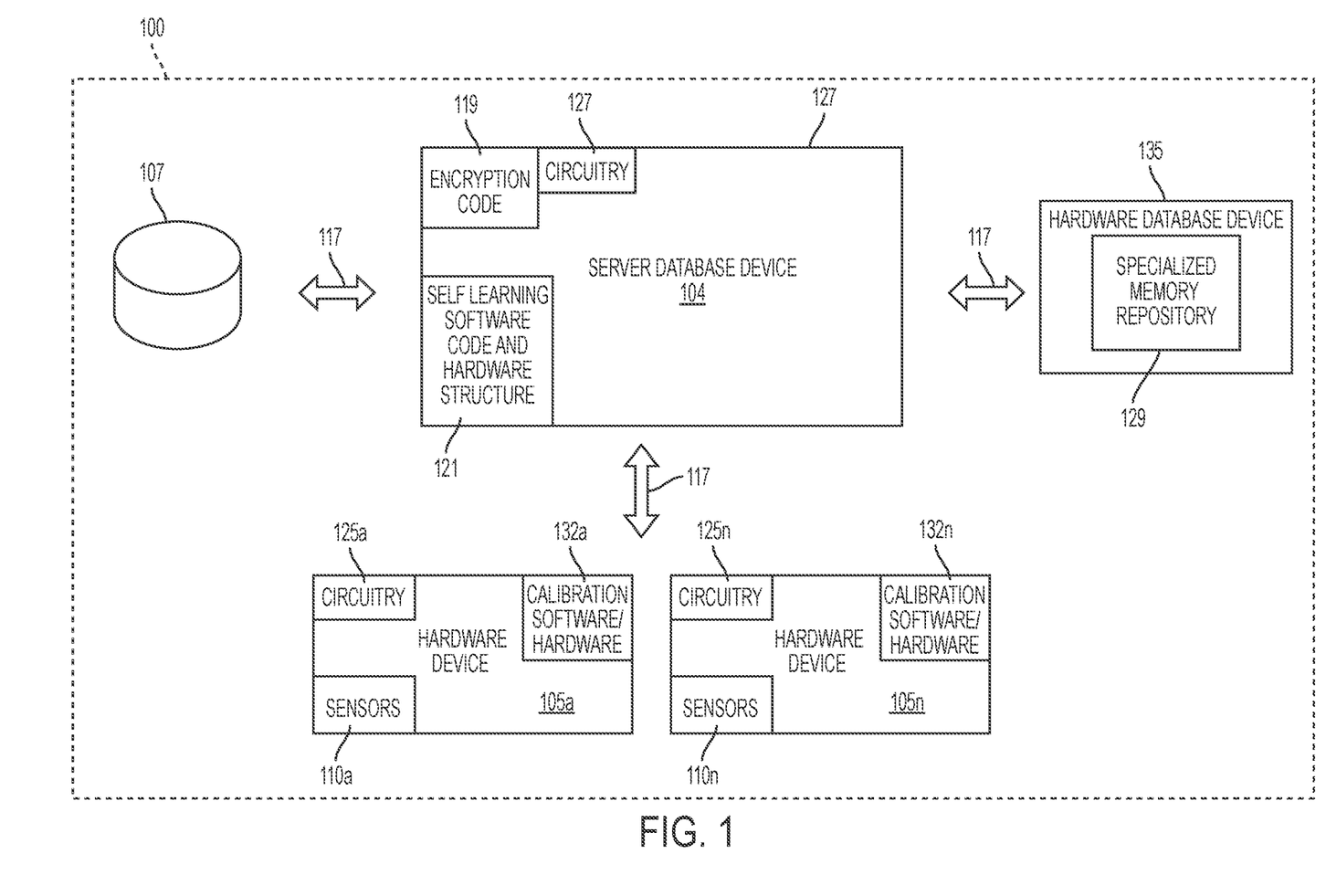
FIG. 1 illustrates a system for improving self-learning software technology associated with enabling sensors for detecting work related selections for users and automatically generating and modifying self-learning software code, in accordance with embodiments of the present invention.

FIG. 1 illustrates a system 100 for improving self-learning software technology associated with enabling sensors for detecting work related selections for users and automatically generating and modifying self-learning software code, in accordance with embodiments of the present invention. System 100 enables a machine learning system for assigning a user task value (e.g., with respect to time) based on user feedback. Additionally, system 100 enables a machine learning system for assigning a satisfaction value (based on user feedback) representing a specified desire to be assigned a work item for task completion. For example, a satisfaction value of −2 may represent a strong aversion to being assigned a specified work item and a satisfaction value of 2 may represent a strong desire to be assigned the specified work item.

When a user completes a work item, an actual task value is recorded and the user provides a numerical satisfaction value with respect to enjoyment of the work item. Over time, a coefficient for converting each team user's estimated task value to an actual task value may be determined via usage of digital code implemented project management techniques. Additionally, each user's work item satisfaction may be digitally tracked (e.g., via sensor retrieved data).

An organization may select a minimum satisfaction level value threshold (e.g., 75%) and assign work related items such that a satisfaction level for each user in maintained. For example, a first user (e.g., a team member) has completed one work item (with a given a satisfaction value of 1) and a second work item (with a given a satisfaction value of 2). Subsequently, the first user may be assigned a subsequent work related item (with a given a satisfaction value of −1) without dropping an overall satisfaction level below the 75%. If team members mark too many work related items with negative satisfaction values and it is impossible to assign work related items without the satisfaction level dropping below the 75% satisfaction level value threshold then there is a mismatch between staffing and work related items.

System 100 generates self-learning learning software code for digitally:

1. Retrieving a list of work related items for assignment to a user for an upcoming work week (e.g., a "sprint" or specified time period for software development). For example, a sprint 7 is planned and there are 10 work related items to be assigned.
2. Gathering predicted satisfaction values from each team member (for each work item) in combination with additional input values such as a predicted time for completion value.
3. Executing typical sprint planning activities such as, inter alia:
  a. Normalizing estimated time values based on historical data. For example, if a user A provided an estimated time value of 3 for a work item 1 in sprint 7 and a resulting normalizing co-efficient for sprint 6 equals 1.15, then a normalized estimated time value for work item 1 in sprint 7 equals 3.45. The normalized estimated time value is generated based on the work related items that user A was assigned in prior sprints.
  b. For each team member, determining an availability for an associated sprint based on vacation plans and competing assignments.

4. When assigning the work related items to the team members, utilizing estimated satisfaction values and associated historical satisfaction data in combination with estimated time values and availability. For example, a round robin method may be executed initiating with a team member associated with a lowest historical satisfaction value and sequentially proceeding to a team member with the highest historical satisfaction value as follows:
   a. Initialize the process with a team member comprising a lowest historical satisfaction value. A satisfaction co-efficient may be calculated in a similar manner as a time based co-efficient (via usage of a moving weighted average).
   b. Assign one work item (of the available work related items) that correlates an associated team member a highest satisfaction rating based on estimated satisfaction values.
   c. Allow a team member to select a work item from multiple work related items. Continue the process until each team member has been assigned at least one work item.

Additionally, the self-learning software code may be executed to determine how many tasks should be assigned to each team member (e.g., a fair share of tasks). The list of team members is initially sorted by associated historical satisfaction scores and the self-learning software code assigns a team member with a lowest historical satisfaction score as a top choice among the tasks to assign. Once a work item is assigned to a team member, the self-learning software code (tool) increments an associated team member's count of assigned tasks and incorporates an estimated satisfaction rating with a historical satisfaction score to create a new projected satisfaction rating. Subsequently, the self-learning software code re-sorts the list of team members and continues the automated loop until every team member has been assigned a fair share of tasks and all the tasks have been assigned. Therefore, it is possible for a person with very low historical satisfaction rating to obtain two top choice tasks before a next team member is assigned tasks.

The self-learning software code may be further executed for totaling time values associated with the tasks and generate an associated fair share function. When a team member has been assigned enough tasks to be associated with full capacity for the sprint, then they are omitted from the list of team members being considered for additional task assignment.

5. At the end of the sprint, actual time and satisfaction values are retrieved (from each team member) for each work item completed.

6. A new normalizing estimate and resulting co-efficient is calculated for each team member using actual time and satisfaction values provided.

7. If it is determined that a team member is associated with a normalized satisfaction estimate that has fallen below a specified indicator (e.g., a manager might set an indicator at 75% such that all team members are associated with a normalized satisfaction estimate average of at least 75%), then a manager may address the issue accordingly.

System 100 of FIG. 1 includes a server database system 104 (i.e., specialized hardware device), hardware devices 105a . . . 105n (i.e., specialized hardware device), a hardware database device 135 comprising a specialized memory repository 129, and a database 107 (e.g., a cloud based system) interconnected through a network 117. Server database system 104 includes specialized circuitry 127 (that may include specialized software), encryption code 119 (for encrypting any output), and self-software code/hardware structure 121. Hardware devices 105a . . . 105n may include personal devices provided to each user or team member. Hardware devices 105a . . . 105n may be Bluetooth enabled to provide connectivity to technical support systems. Hardware devices 105a . . . 105n include specialized circuitry 125a . . . 125n (that may include specialized software), calibration software/hardware 132a . . . 132n, and sensors 110a . . . 110n. Sensors 110a . . . 110n may include any type of internal or external sensors including, inter alia, a heart rate monitor, a blood test sensor (i.e., for testing increased levels of dopamine, serotonin, oxytocin, endorphins, etc.), a blood pressure monitor, a temperature sensor, a pulse rate monitor, an ultrasonic sensor, an optical sensor, a video retrieval device, humidity sensors, etc. Calibration software/hardware 132a . . . 132n may include specialized testing circuitry/logic. Server database system 104, hardware devices 105a . . . 105n, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server database system 104, hardware devices 105 . . . 105n, and database 107 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry may include proprietary specially designed components (e.g., a specialized integrated circuit), such as for example an Application Specific Integrated Circuit (ASIC) or field programmable gate array (FPGA) designed for only implementing an automated process for improving self-learning software technology associated with enabling sensors for detecting work related selections for users and automatically generating and modifying self-learning software code. Network 117 may include any type of network including, inter alia, a local area network, (LAN), a wide area network (WAN), the Internet, a wireless network, etc. Alternatively, network 117 may include an application programming interface (API).

System 100 comprises a machine learning system for generating self-learning software code for enabling a process associated with the following implementation example: The process is initiated by a company employing various individuals each associated with varying skills (e.g., carpentry, plumbing, engineering, electrical skills, etc.). The company provides each employee with a specialized hardware device (e.g., hardware devices 105a . . . 105n) for performing job duty (i.e., a task or work item) planning and assignment. A server (e.g., server database system 104) comprises a database (e.g., database 107) for storing a list of work related items. The server is enabled for auto connection each specialized hardware device so that each employee may input values related to work related items. Additionally, sensors (e.g., sensors 110a . . . 110n) may be configured for retrieving work related selections. The work related items stored on the server are defined by an administrator or project manager at the company via usage of a specialized hardware device. The project manager defines a time period (e.g., a week) for associated work related items (for completion during the time period) on the server. Each specialized hardware device retrieves user input and communicates with the server to retrieve a list of work related items for the time period. In response, the specialized hardware devices automatically presents all details associated with the work related items to each employee and prompts each employee to input an expected satisfaction (e.g., a numerical value from −2 to 2) in combination with additional factors such as an estimated time to complete an associated job. All inputs are stored and estimated on the server and/or a specialized memory repository (e.g., specialized memory repoitory 129 of hardware database device 135). For example, estimates for job completion times may be generated based on historical data from an associated employee. Additionally, the server executes code for assigning work related items using expected and historical satisfaction values received from the employees. A round robin method may be executed to assign jobs and a normalizing estimate and resulting co-efficient is calculated for each team member using actual time and satisfaction values provided as described, supra. Additionally, sensors may be enabled for measuring satisfaction levels. For example, blood pressure may be monitored and a low blood pressure reading may indicate happiness or a calm mood thereby representing specified satisfaction levels.

Figure 2:
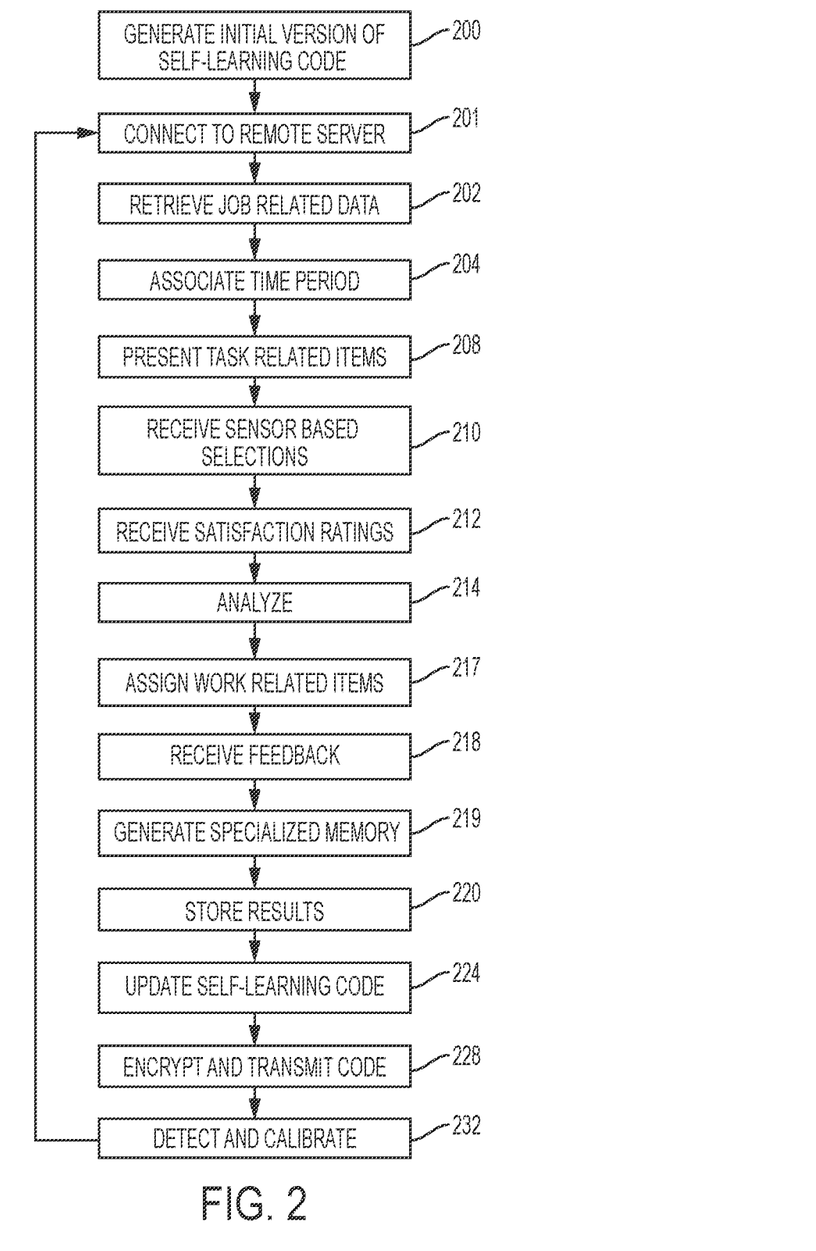
FIG. 2 illustrates an algorithm detailing a process flow enabled by the system of FIG. 1 for improving self-learning software technology associated with enabling sensors for detecting work related selections for users and automatically generating and modifying self-learning software code, in accordance with embodiments of the present invention.

FIG. 2 illustrates an algorithm detailing a process flow enabled by system 100 of FIG. 1 for improving self-learning software technology associated with enabling sensors for detecting work related selections for users and automatically generating and modifying self-learning software code, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server database system 104 and hardware devices 105a . . . 105n. In step 200, an initial version of self-learning code is generated. In step 201, hardware devices (e.g., hardware devices 105a . . . 105n of FIG. 1) are automatically connected to a remote server database system (e.g., server database system 105 of FIG. 1). In step 202, job related data associated with job roles for users is retrieved from the remote server database system. In step 204, a specified time period is associated with the job related data. Additionally, work related items (of the job related data) are initially assigned (e.g., by an authoritative source such as a manager) to the users. In step 208, the work related items (of the job related data) to be performed during the specified time period are presented to a user (of the users) via the hardware device. In step 210, first selections for specified work related items are received from the user via sensors of the hardware device. Additionally, additional selections for additional work related items may be received from additional users via additional sensors of additional hardware devices. In step 212, expected satisfaction ratings for the specified work related items and the additional work related items are received by the remote server database system. In step 214, all selections from step 210 are analyzed with respect to the expected satisfaction ratings. In step 217, at least one work item of the selection is assigned to the user based on results of step 214. Additionally, work related items of the additional selections may be assigned to the additional users based on results of step 214. In step 218, feedback data and biometrics data associated with actual satisfaction ratings is received via a specialized graphical user interface. In step 219, a specialized memory repository (e.g., specialized memory repository 129 of FIG.1) is generated within a specified portion of a hardware memory device (e.g., hardware database device 135 of FIG. 1). In step 220, results of the assignment of step 217 are stored within the specialized memory repository. In step 224, the initial self-learning software code (of step 200) for executing future task assignment processes is updated (based on the actual satisfaction ratings and the biometrics data collected in step 218) and modified (i.e., based on results of future task assignment processes). Additionally, biometric levels of the users may be automatically detected during performance of a task. The biometric levels and an actual satisfaction rating are used for assigning the work related items. In step 228, the self-learning software code is encrypted resulting in an encrypted self-learning software application. The encrypted self-learning software application is transmitted to the remote server database system. In step 232, a calibration error of at least one sensor is automatically detected. In response, at least one sensor is automatically calibrated and step 201 is repeated during a next iteration. The calibration process may include calibrating software and/or hardware associated with the at least one sensor.

Figure 3:
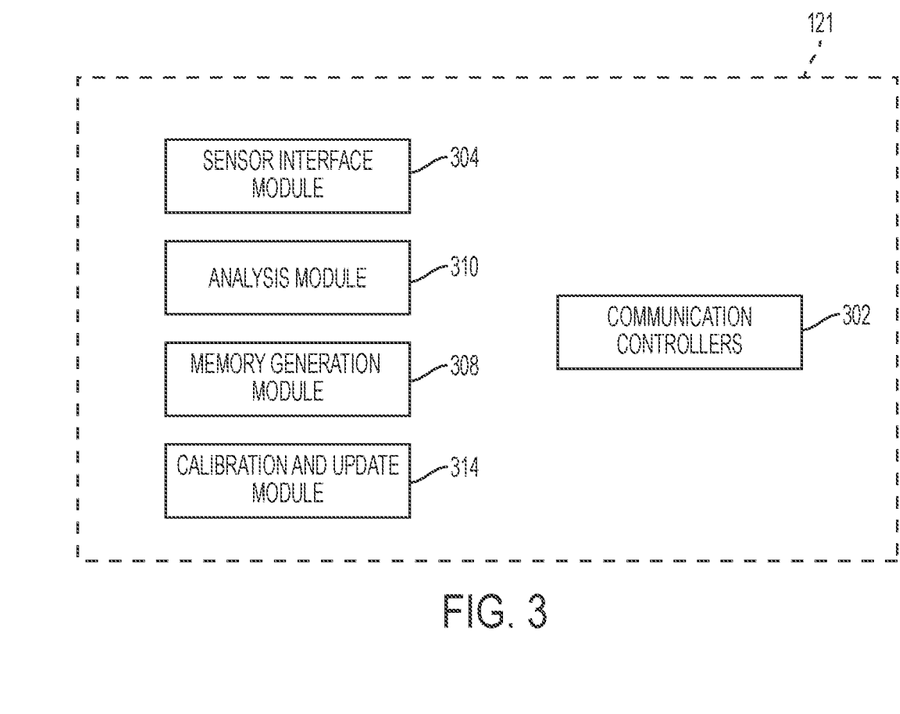
FIG. 3 illustrates an internal structural view of the self-learning software code and hardware structure of FIG. 1, in accordance with embodiments of the present invention.

FIG. 3 illustrates an internal structural view of self-learning software code/hardware structure 121 of FIG. 1, in accordance with embodiments of the present invention. Self-learning software code/hardware structure 121 includes a sensor interface module 304, an analysis module 310, a memory generation module 308, a calibration and update module 314, and communication controllers 302. Sensor interface module 304 comprises specialized hardware and software for controlling all functions related to sensors 110a . . . 110n of FIG. 1. Analysis module 310 comprises specialized hardware and software for controlling all functionality related to execution of step 214 of FIG. 2. Memory generation module 308 comprises specialized hardware and software for controlling all functionality related to generation and modification of any specialized memory structure. Calibration and update module 314 calibrates and updates all hardware (e.g., firmware, sensors, circuitry, etc.) and software of system 100 of FIG. 1. Communication controllers 302 are enabled for controlling all communications between sensor interface module 304, analysis module 310, memory generation module 308, and calibration and update module 314.

Figure 4:
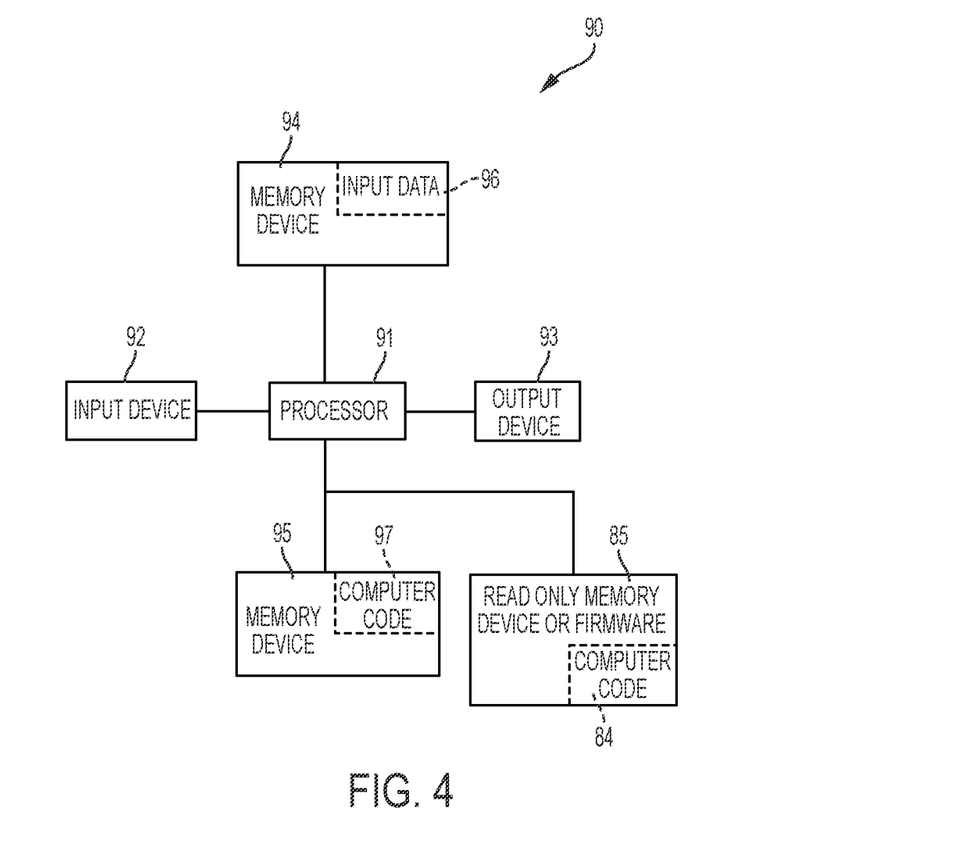
FIG. 4 illustrates a computer system used by the system of FIG. 1 for improving self-learning software technology associated with enabling sensors for detecting work related selections for users and automatically generating and modifying self-learning software code, in accordance with embodiments of the present invention.

FIG. 4 illustrates a computer system 90 (e.g., hardware devices 105a . . . 105n and/or server database system 104 of FIG. 1) used by or comprised by the system of FIG. 1 for improving self-learning software technology associated with enabling sensors for detecting work related selections for users and automatically generating and modifying self-learning software code, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving self-learning software technology associated with enabling sensors for detecting work related selections for users and automatically generating and modifying self-learning software code. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve self-learning software technology associated with enabling sensors for detecting work related selections for users and automatically generating and modifying self-learning software code. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving self-learning software technology associated with enabling sensors for detecting work related selections for users and automatically generating and modifying self-learning software code. In another embodiment, the invention provides a business method that performs the process steps of the invention on a subscription, advertising, and/or fee basis. That is, a service supplier, such as a Solution Integrator, could offer to enable a process for improving self-learning software technology associated with enabling sensors for detecting work related selections for users and automatically generating and modifying self-learning software code. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly deprovision to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
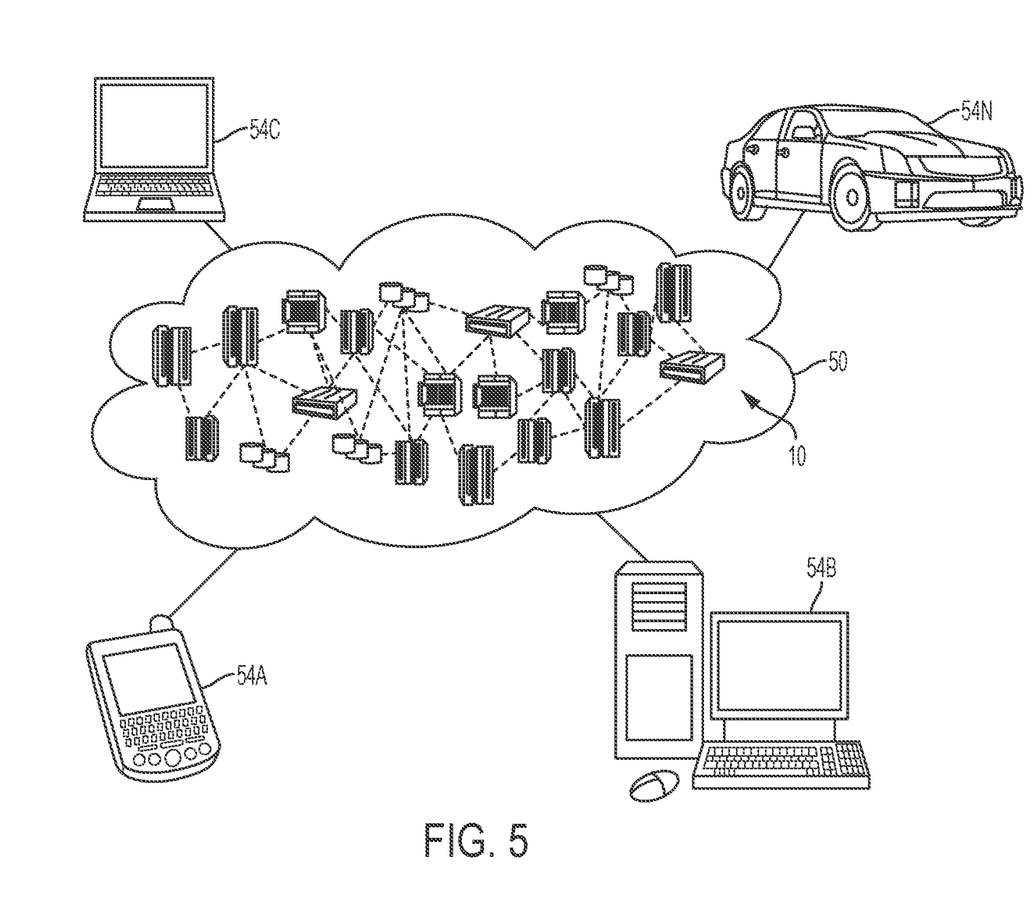
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
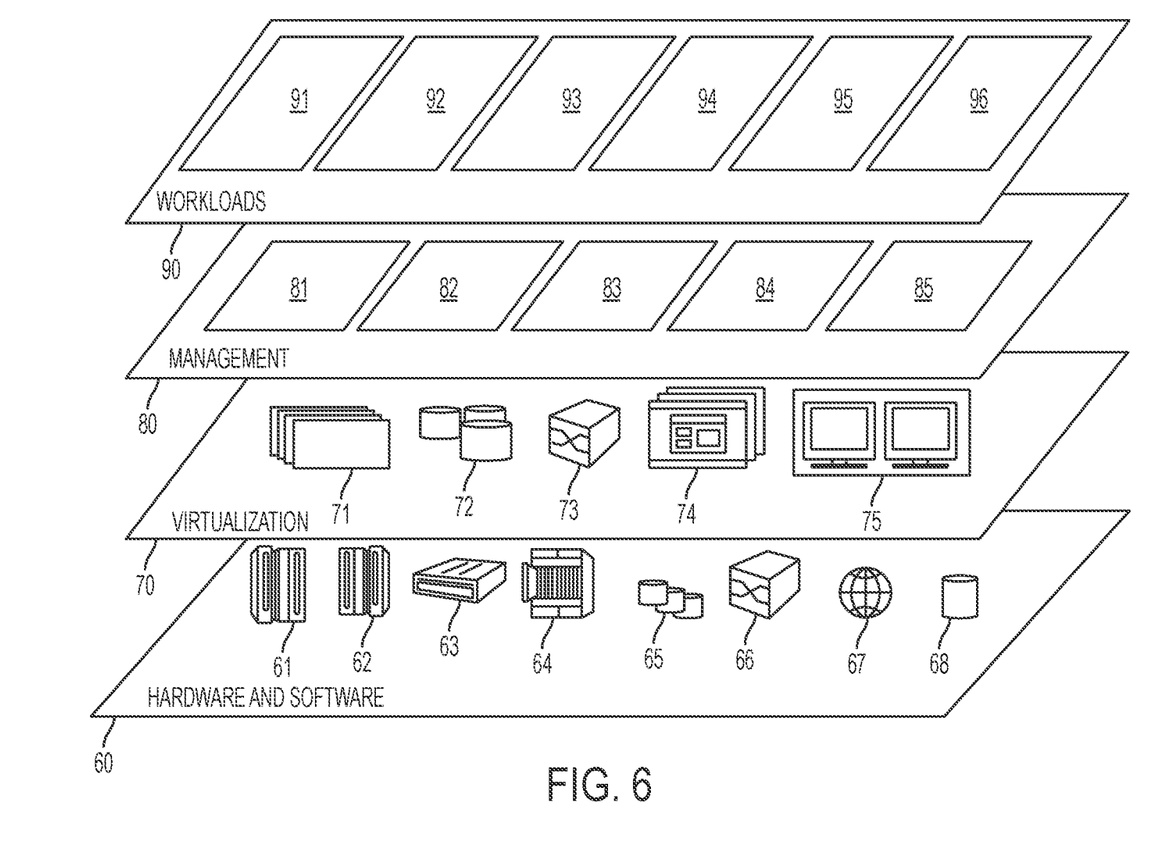
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) are shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving self-learning software technology associated with enabling sensors for detecting work related selections for users and automatically generating and modifying self-learning software code 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A machine learning task assignment improvement method comprising:
  connecting, by one or more processors, a hardware device and additional hardware devices to a remote server database system;
  retrieving, by said one or more processors from said remote server database system, job related data associated with job roles for a plurality of users;
  initially assigning to said plurality of users, by said one or more processors in response to a command from an authoritative source, work related items of said job related data, wherein said work related items are associated with specified tasks for completion, and wherein said specified tasks comprise carpentry tasks, plumbing tasks, engineering tasks, and electrical skills related tasks;
  retrieving, by said one or more processors from a historical database, estimated time values associated with said plurality of users with respect to completion of said work related items;
  normalizing, by said one or more processors based on the prior assigned work related items associated with said plurality of users, estimated time values resulting in the generation of normalized time values;

presenting with respect to said normalized time values, by said one or more processors to a user of said plurality of users, said work related items of said job related data to be performed during a specified time period;
receiving, by said one or more processors from said user via sensors of said hardware device, selections for specified work related items of said work related items;
receiving, by said one or more processors from additional users of said plurality of users via additional sensors of said additional hardware devices, additional selections for additional work related items of said work related items;
receiving, by said one or more processors from said user and said additional users, expected satisfaction ratings for said specified work related items and said additional work related items, wherein said expected satisfaction ratings comprise negative and positive satisfaction values representing said expected satisfaction ratings;
automatically detecting, by said one or more processors via said sensors and said additional sensors, biometric levels of said user and said additional users;
measuring, by said one or more processors via said sensors and said additional sensors in response to said automatically detecting said biometric levels, user based satisfaction levels by monitoring blood pressure attributes of said user and said additional users, wherein low blood pressure readings of said blood pressure attributes indicate a happy or a calm mood thereby representing satisfaction levels associated with said expected satisfaction ratings;
first analyzing, by said one or more processors with respect to said biometric levels, said selections and said additional selections with respect to said expected satisfaction ratings;
first assigning to said user, by said one or more processors based on results of said first analyzing, at least one work item of said selections;
second assigning to said additional users, by said one or more processors based on said results of said first analyzing, additional work related items of said additional selections;
receiving, by said one or more processors from said user and said additional users, actual satisfaction ratings for said specified work related items and said additional work related items, wherein said actual satisfaction ratings comprise negative and positive satisfaction values representing said actual satisfaction ratings;
automatically detecting, by said one or more processors via said sensors and said additional sensors, additional biometric levels of said user and said additional users, wherein said first assigning and said second assigning are further based on said additional biometric levels and said additional satisfaction ratings;
second analyzing, by said one or more processors with respect to said additional biometric levels, said first selections and said additional selections with respect to said actual satisfaction ratings;
digitally tracking, by said one or more processors via tracking sensors, said actual satisfaction ratings;
generating, by said one or more processors, a specialized memory repository within a specified portion of a hardware memory device;
storing, by said one or more processors within said specialized memory repository, results of said first assigning and said second assigning;
generating, by said one or more processors from said results of said first assigning, said second assigning, said first analyzing, and said second analyzing, self-learning software code for executing future task assignment processes;
modifying, by said one or more processors based on results of said future task assignment processes and results of said digitally tracking, said self-learning software code;
automatically detecting by said one or more processors, a calibration error of at least one biometric sensor of said sensors and said additional sensors; and
automatically calibrating, by said one or more processors, software of said at least one biometric sensor.

2. The method of claim 1, further comprising:
encrypting, by said one or more processors, said self-learning software code resulting in an encrypted self-learning software application; and
transmitting, by said one or more processors, said encrypted self-learning software application to said remote server database system.

3. The method of claim 1, further comprising:
associating, by said one or more processors, a specified time period with said job related data;
automatically updating, by said one or more processors based on said biometric levels, said self-learning software code.

4. The method of claim 1, further comprising:
receiving, by said one or more processors from said user and said additional users via a specialized graphical user interface, feedback data associated with said expected satisfaction ratings and said actual satisfaction ratings, wherein said first assigning and said second assigning are further based on said feedback data.

5. The method of claim 4, further comprising:
automatically updating, by said one or more processors based on said feedback data, said self-learning software code.

6. The method of claim 1, further comprising:
providing at least one support service for at least one of creating, integrating, hosting, maintaining, and deploying computer-readable code in the hardware device, said code being executed by the computer processor to implement: said connecting, said retrieving, said initially assigning, said presenting, said receiving said selections, said receiving said additional selections, said receiving said expected satisfaction ratings, said first analyzing, said first assigning, said second assigning, said receiving said actual satisfaction ratings, said second analyzing, said generating said specialized memory repository, said storing, said generating said self-learning software code, and said modifying.

7. A computer program product, comprising a computer readable hardware storage device storing a computer readable program code, said computer readable program code comprising an algorithm that when executed by one or more processors implements a machine learning machine learning task assignment improvement method, said method comprising:
connecting, by said one or more processors a hardware device and additional hardware devices to a remote server database system;
retrieving, by said one or more processors from said remote server database system, job related data associated with job roles for a plurality of users;
initially assigning to said plurality of users, by said one or more processors in response to a command from an authoritative source, work related items of said job related data, wherein said work related items are associated with specified tasks for completion, and wherein said specified tasks comprise carpentry tasks, plumbing tasks, engineering tasks, and electrical skills related tasks;

retrieving, by said one or more processors from a historical database, estimated time values associated with said plurality of users with respect to completion of said work related items;

normalizing, by said one or more processors based on the prior assigned work related items associated with said plurality of users, estimated time values resulting in the generation of normalized time values;

presenting with respect to said normalized time values, by said one or more processors to a user of said plurality of users, said work related items of said job related data to be performed during a specified time period;

receiving, by said one or more processors from said user via sensors of said hardware device, selections for specified work related items of said work related items;

receiving, by said one or more processors from additional users of said plurality of users via additional sensors of said additional hardware devices, additional selections for additional work related items of said work related items;

receiving, by said one or more processors from said user and said additional users, expected satisfaction ratings for said specified work related items and said additional work related items, wherein said expected satisfaction ratings comprise negative and positive satisfaction values representing said expected satisfaction ratings;

automatically detecting, by said one or more processors via said sensors and said additional sensors, biometric levels of said user and said additional users;

measuring, by said one or more processors via said sensors and said additional sensors in response to said automatically detecting said biometric levels, user based satisfaction levels by monitoring blood pressure attributes of said user and said additional users, wherein low blood pressure readings of said blood pressure attributes indicate a happy or a calm mood thereby representing satisfaction levels associated with said expected satisfaction ratings;

first analyzing, by said one or more processors with respect to said biometric levels, said selections and said additional selections with respect to said expected satisfaction ratings;

first assigning to said user, by said one or more processors based on results of said first analyzing, at least one work item of said selections;

second assigning to said additional users, by said one or more processors based on said results of said first analyzing, additional work related items of said additional selections;

receiving, by said one or more processors from said user and said additional users, actual satisfaction ratings for said specified work related items and said additional work related items, wherein said actual satisfaction ratings comprise negative and positive satisfaction values representing said actual satisfaction ratings;

automatically detecting, by said one or more processors via said sensors and said additional sensors, additional biometric levels of said user and said additional users, wherein said first assigning and said second assigning are further based on said additional biometric levels and said additional satisfaction ratings;

second analyzing, by said one or more processors with respect to said additional biometric levels, said first selections and said additional selections with respect to said actual satisfaction ratings;

digitally tracking, by said one or more processors via tracking sensors, said actual satisfaction ratings;

generating, by said one or more processors, a specialized memory repository within a specified portion of a hardware memory device;

storing, by said one or more processors within said specialized memory repository, results of said first assigning and said second assigning;

generating, by said one or more processors from said results of said first assigning, said second assigning, said first analyzing, and said second analyzing, self-learning software code for executing future task assignment processes;

modifying, by said one or more processors based on results of said future task assignment processes and results of said digitally tracking, said self-learning software code;

automatically detecting by said one or more processors, a calibration error of at least one biometric sensor of said sensors and said additional sensors; and automatically calibrating, by said one or more processors, hardware and software of said at least one biometric sensor.

8. The computer program product of claim 71, wherein said method further comprises:

encrypting, by said one or more processors, said self-learning software code resulting in an encrypted self-learning software application; and transmitting, by said one or more processors, said encrypted self-learning software application to said remote server database system.

9. The computer program product of claim 7, wherein said method further comprises:

automatically updating, by said one or more processors based on said biometric levels, said self-learning software code.

10. The computer program product of claim 7, wherein said method further comprises:

receiving, by said one or more processors from said user and said additional users via a specialized graphical user interface, feedback data associated with said expected satisfaction ratings and said actual satisfaction ratings, wherein said first assigning and said second assigning are further based on said feedback data.

11. The computer program product of claim 10, wherein said method further comprises:

automatically updating, by said one or more processors based on said feedback data, said self-learning software code.

12. A hardware device comprising one or more processors, a computer-readable memory unit, and sensors, said computer-readable memory unit comprising instructions that when executed by one or more processors implements machine learning task assignment, said one or more processors programmed to:

connect said hardware device and additional hardware devices to a remote server database system;

retrieve from said remote server database system, job related data associated with job roles for a plurality of users;

initially assigning to said plurality of users in response to a command from an authoritative source, work related items of said job related data, wherein said work related items are associated with specified tasks for completion, and wherein said specified tasks comprise carpentry tasks, plumbing tasks, engineering tasks, and electrical skills related tasks;

retrieve from a historical database, estimated time values associated with said plurality of users with respect to completion of said work related items;

normalize based on the prior assigned work related items associated with said plurality of users, estimated time values resulting in the generation of normalized time values;

present with respect to said normalized time values to a user of said plurality of users, said work related items of said job related data to be performed during a specified time period;

receive from said user via said sensors of said hardware device, selections for specified work related items of said work related items;

receive from additional users of said plurality of users via additional sensors of said additional hardware devices, additional selections for additional work related items of said work related items;

receive from said user and said additional users, expected satisfaction ratings for said specified work related items and said additional work related items, wherein said expected satisfaction ratings comprise negative and positive satisfaction values representing said expected satisfaction ratings;

automatically detecting via said sensors and said additional sensors, biometric levels of said user and said additional users;

measure via said sensors and said additional sensors in response to said automatically detecting said biometric levels, user based satisfaction levels by monitoring blood pressure attributes of said user and said additional users, wherein low blood pressure readings of said blood pressure attributes indicate a happy or a calm mood thereby representing satisfaction levels associated with said expected satisfaction ratings;

first analyze with respect to said biometric levels, said selections and said additional selections with respect to said expected satisfaction ratings;

first assign to said user, by said one or more processors based on results of analysis of said selections and said additional selections with respect to said expected satisfaction ratings, at least one work item of said selections;

second assign to said additional users, by said one or more processors based on said results of said analysis of said selections and said additional selections with respect to said expected satisfaction ratings, additional work related items of said additional selections;

receive from said user and said additional users, actual satisfaction ratings for said specified work related items and said additional work related items, wherein said actual satisfaction ratings comprise negative and positive satisfaction values representing said actual satisfaction ratings;

automatically detect via said sensors and said additional sensors, additional biometric levels of said user and said additional users, wherein said first assigning and said second assigning are further based on said additional biometric levels and said additional satisfaction ratings;

second analyze with respect to said additional biometric levels, said first selections and said additional selections with respect to said actual satisfaction ratings;

digitally track via tracking sensors, said actual satisfaction ratings;

enable generation of a specialized memory repository within a specified portion of a hardware memory device;

enable storage within said specialized memory repository, results of said first assigning and said second assigning;

generate from said results of said first assigning, said second assigning, said first analyzing, and said second analyzing, self-learning software code for executing future task assignment processes;

modify based on results of said future task assignment processes and results of said digitally tracking, said self-learning software code;

automatically detect a calibration error of at least one biometric sensor of said sensors and said additional sensors plurality; and automatically calibrate software of said at least one biometric sensor.

* * * * *